US012672939B2

(12) United States Patent
Wang et al.

(10) Patent No.: US 12,672,939 B2
(45) Date of Patent: Jul. 7, 2026

(54) DENTAL APPLIANCES FROM MULTILAYER FILMS HAVING DISCRETE STRUCTURES COVERED BY AN ION PERMEABLE RELEASE LAYER

(71) Applicant: Solventum Intellectual Properties Company, Maplewood, MN (US)

(72) Inventors: Yizhong Wang, Woodbury, MN (US); Ta-Hua Yu, Woodbury, MN (US)

(73) Assignee: Solventum Intellectual Properties Company, Eagan, MN (US)

( * ) Notice: Subject to any disclaimer, the term of this patent is extended or adjusted under 35 U.S.C. 154(b) by 381 days.

(21) Appl. No.: 18/258,912

(22) PCT Filed: Jan. 14, 2022

(86) PCT No.: PCT/IB2022/050304
§ 371 (c)(1),
(2) Date: Jun. 22, 2023

(87) PCT Pub. No.: WO2022/162488
PCT Pub. Date: Aug. 4, 2022

(65) Prior Publication Data
US 2024/0041565 A1 Feb. 8, 2024

Related U.S. Application Data

(60) Provisional application No. 63/199,865, filed on Jan. 29, 2021.

(51) Int. Cl.
A61C 7/08 (2006.01)
A61C 19/06 (2006.01)
(Continued)

(52) U.S. Cl.
CPC .............. A61C 7/08 (2013.01); A61C 19/063 (2013.01); B29C 51/02 (2013.01); B29C 51/14 (2013.01);
(Continued)

(58) Field of Classification Search
CPC ............................. A61C 19/063; A61K 6/884
See application file for complete search history.

(56) References Cited

U.S. PATENT DOCUMENTS 4,298,738 A 11/1981 Lechtken et al.
4,324,744 A 4/1982 Lechtken et al.
(Continued)

FOREIGN PATENT DOCUMENTS

EP 0173567 A2 3/1986
EP 0201778 B1 12/1988
(Continued)

OTHER PUBLICATIONS

KR 20190090428 A (TBM Company) (Yun S; Jaewoong J; Dong K Y; Mu S L; Eun K Y; Seung H M; Hee S Y) Film for relieving sensitive teeth and dental caries, Aug. 2, 2019 [retrieved on Jul. 23, 2025] Translation retrieved from: Espacenet (Year: 2019).*
(Continued)

*Primary Examiner* — Eric J Rosen
*Assistant Examiner* — Courtney N Huynh

(57) ABSTRACT

A method for making a dental appliance configured to position at least one tooth of a patient includes printing a hard-enable liquid resin composition on a major surface of a polymeric material to form a pattern of discrete unhardened liquid regions thereon; at least partially hardening the unhardened liquid regions to form a corresponding array of structures on the major surface of the polymeric material, wherein the structures have a characteristic cross-sectional dimension of about 25 microns to about 1 mm, and a feature
(Continued)

spacing of about 100 microns to about 2000 microns; forming an exterior layer comprising a ion-permeable polymeric material on the base polymeric material and the array of structures; and forming a plurality of cavities in the polymeric material to form the dental appliance including an arrangement of cavities configured to receive one or more teeth.

20 Claims, 5 Drawing Sheets

(51) Int. Cl.

| | |
|---|---|
| *B29C 51/02* | (2006.01) |
| *B29C 51/14* | (2006.01) |
| *B29K 33/00* | (2006.01) |
| *B29K 67/00* | (2006.01) |
| *B29K 105/00* | (2006.01) |
| *B29L 31/00* | (2006.01) |

(52) U.S. Cl.
CPC ...... *B29K 2033/12* (2013.01); *B29K 2067/00* (2013.01); *B29K 2105/0035* (2013.01); *B29L 2031/753* (2013.01)

(56) References Cited

U.S. PATENT DOCUMENTS

| | | | |
|---|---|---|---|
| 4,356,296 | A | 10/1982 | Griffith et al. |
| 4,385,109 | A | 5/1983 | Lechtken et al. |
| 4,503,169 | A | 3/1985 | Randklev |
| 4,642,126 | A | 2/1987 | Zador et al. |
| 4,648,843 | A | 3/1987 | Mitra |
| 4,652,274 | A | 3/1987 | Boettcher et al. |
| 4,665,217 | A | 5/1987 | Reiners et al. |
| 4,695,251 | A | 9/1987 | Randklev |
| 4,710,523 | A | 12/1987 | Lechtken et al. |
| 4,737,593 | A | 4/1988 | Ellrich et al. |
| 4,752,338 | A | 6/1988 | Reiners et al. |
| 5,026,902 | A | 6/1991 | Fock et al. |
| 5,076,844 | A | 12/1991 | Fock et al. |
| 5,545,676 | A | 8/1996 | Palazzotto et al. |
| 6,030,606 | A | 2/2000 | Holmes |
| 6,251,963 | B1 | 6/2001 | Kohler et al. |
| 6,444,725 | B1 * | 9/2002 | Trom ...................... A61K 6/20 |
| | | | 522/75 |

| | | | |
|---|---|---|---|
| 10,426,574 | B2 | 10/2019 | Raby et al. |
| 2003/0166737 | A1 | 9/2003 | Dede et al. |
| 2005/0260544 | A1 * | 11/2005 | Jones ................... A61C 19/063 |
| | | | 424/49 |
| 2006/0199141 | A1 | 9/2006 | Wen |
| 2007/0207434 | A1 * | 9/2007 | Kuo ........................ A61C 7/08 |
| | | | 433/6 |
| 2008/0182218 | A1 | 7/2008 | Chen et al. |
| 2019/0247173 | A1 * | 8/2019 | Zegarelli ............... B33Y 10/00 |
| 2020/0015937 | A1 | 1/2020 | Stewart |

FOREIGN PATENT DOCUMENTS

| | | | | |
|---|---|---|---|---|
| EP | 0201031 | B1 | 8/1989 | |
| EP | 0373384 | B1 | 10/1992 | |
| KR | 20190090428 | A * | 8/2019 | ........... A61K 6/0675 |
| WO | WO-9744011 | A1 * | 11/1997 | ............ A61K 9/009 |
| WO | 2000038619 | A2 | 7/2000 | |
| WO | 2000042092 | A1 | 7/2000 | |
| WO | 2001007444 | A1 | 2/2001 | |
| WO | 2001092271 | A1 | 12/2001 | |
| WO | 2002024100 | A1 | 3/2002 | |
| WO | 2003092525 | A2 | 11/2003 | |
| WO | 2006060547 | A2 | 6/2006 | |
| WO | 2006096558 | A2 | 9/2006 | |
| WO | 2009076491 | A2 | 6/2009 | |
| WO | WO-2020079555 | A1 * | 4/2020 | .............. A61C 7/08 |
| WO | 2020104926 | A1 | 5/2020 | |
| WO | 2020225657 | A1 | 11/2020 | |
| WO | 2021137119 | A1 | 7/2021 | |
| WO | 2021137159 | A1 | 7/2021 | |
| WO | 2021137161 | A1 | 7/2021 | |
| WO | 2021191773 | A1 | 9/2021 | |
| WO | 2022003534 | A1 | 1/2022 | |
| WO | 2022136974 | A1 | 6/2022 | |

OTHER PUBLICATIONS

WO 9744011 A1 (Vassilios et al) Membrane System for Controlled Release of a Soluble Substance, Nov. 27, 1997 [retrieved on Jul. 23, 2025] Translation retrieved from: Espacenet (Year: 1997).*

KR 20190090428 A (TBM Company) (Yun S; Jaewoong J; Dong K Y; Mu S L; Eun K Y; Seung H M; Hee S Y) Film for relieving sensitive teeth and dental caries, Aug. 2, 2019 (Year: 2019).*

International Search Report for PCT International Application No. PCT/IB2022/050304, mailed on Mar. 25, 2022, 5 pages.

* cited by examiner

DENTAL APPLIANCES FROM MULTILAYER FILMS HAVING DISCRETE STRUCTURES COVERED BY AN ION PERMEABLE RELEASE LAYER

CROSS REFERENCE TO RELATED APPLICATIONS

This application is a national stage filing under 35 U.S.C. 371 of PCT/IB2022/050304, filed Jan. 14, 2022, which claims the benefit of U.S. Provisional Application No. 63/199,865, filed Jan. 29, 2021, the disclosures of which are incorporated by reference in their entireties herein.

BACKGROUND

Orthodontic treatments reposition misaligned teeth and improve bite configurations for improved cosmetic appearance and dental function. Teeth are repositioned by applying controlled forces to the teeth over an extended time period. In one example, teeth may be repositioned by placing a dental appliance, generally referred to as an orthodontic aligner or an orthodontic aligner tray, over the teeth of the patient for each treatment stage of an orthodontic treatment. The orthodontic alignment tray includes a polymeric shell defining a plurality of cavities for receiving one or more teeth. The individual cavities in the polymeric shell are shaped to exert force on one or more teeth to resiliently and incrementally reposition selected teeth or groups of teeth in the upper or lower jaw.

A series of orthodontic aligner trays are provided to a patient to be worn sequentially and alternatingly during each stage of the orthodontic treatment to gradually reposition teeth from one tooth arrangement to a successive tooth arrangement to achieve a desired tooth alignment condition. Once the desired alignment condition is achieved, an aligner tray, or a series of aligner trays, may be used periodically or continuously in the mouth of the patient to maintain tooth alignment. In addition, orthodontic retainer trays may be used for an extended time period to maintain tooth alignment following the initial orthodontic treatment.

SUMMARY

In some examples, a stage of orthodontic treatment may require that an aligner tray remain in the mouth of the patient for several hours a day, over an extended time period of days, weeks or even months. While the orthodontic aligner tray is in use in the mouth of the patient, foods or other substances can stain or otherwise damage the appliance. In addition, microorganisms can contaminate the surface of the appliance, which in some cases can also cause biofilms to form on the surface. The biofilms can be difficult to remove, even if the appliance is periodically cleaned.

Microorganisms or biofilm buildup on the surface of the aligner tray can stain or otherwise discolor the aligner tray, can cause undesirable tastes and odors, and even potentially lead to various periodontal diseases.

Structures including medicaments for addressing these and other oral case issues can be applied to a selected surface of an aligner tray. Some medicaments, such as fluoride, calcium phosphate, pH buffer, antimicrobial agents can help to manage oral conditions to reduce the biofilm burden on teeth. The structures may include dental materials suitable for releasing active agents or other therapeutics. For example, the structures can release ions or compounds to protect the teeth against decalcification, reduce cavities, prevent biofilm formation on the exposed surfaces of the dental appliance, reduce, eliminate, and repair white spot lesions, and the like. As another example, a dental sealant can release fluoride ions for tooth strengthening and carious prevention and/or quaternary ammonium molecule for antibacterial. Glass ionomer and resin modified glass ionomer restorative materials can release fluoride ions, calcium, phosphate, some bioactive materials can provide pH buffering capability.

These safe-to-use dental materials are available and can be cured into hard structures on an appliance surface, however these cured dental materials typically lack processability to be molded under strain typically encountered in processes, such as thermoforming, used in making a dental appliance. The term "thermoforming" refers to a process for preparing a shaped, formed, etc., article from a thermoformable film or web of polymeric material. In typical thermoforming, the thermoformable web may be heated to its melting or softening point, stretched over or into a temperature-controlled, single-surface mold and then held against the mold surface until cooled (solidified). The formed article may then be trimmed to remove excess thermoformed material.

Thermoforming may include vacuum molding, pressure molding, plug-assist molding, vacuum snapback molding, etc. A flat sheet including cured dental materials is susceptible to being broken and peeled off from the base substrate during a typical thermoforming process.

In general, the present disclosure is directed to a dental appliance that includes a polymeric film substrate to which a pattern of discrete structures has been applied and a flexible, fluid permeable release layer disposed over the substrate and the discreet structures. The fluid permeable layer can assist in regulating the release of the underlying therapeutic materials into the oral environment. The fluid permeable layer can further improve the adhesion of discreet structures to the base substrate. The substrate with the discrete structures may be formed into a dental appliance including one or more tooth-retaining cavities, and the discrete structures may be present on an interior surface of the dental appliance adjacent to the teeth of a patient, or on an outwardly facing surface of the dental appliance facing away from the teeth, or both.

In various embodiments, the discrete structures may be applied in an aesthetic pattern, and in some cases the discrete structures include an optional therapeutic agent that provides a beneficial effect when the formed dental appliance is ultimately utilized in a mouth of a patient. For example, the therapeutic agents or compounds released therefrom can protect the teeth against decalcification, reduce cavities, prevent biofilm formation on the exposed surfaces of the dental appliance, and the like. In another aspect, the discrete structures on the dental appliance can be used to modify the force applied to the teeth of the patient such as, for example, to counteract viscoelastic creep/stretch, which can enhance the effectiveness of a particular treatment protocol and improve patient comfort.

In one aspect, the present disclosure provides a method for making a dental appliance configured to position at least one tooth of a patient, the method comprising depositing a hardenable liquid resin composition on a major surface of a base polymeric material to form a pattern of discrete unhardened liquid regions thereon. The hardenable liquid composition comprises a hardenable resin, a liquid carrier, and a therapeutic agent. The method further comprises at least partially hardening the unhardened liquid regions to form a corresponding array of structures on the major surface of the polymeric material, the array forming a discontinuous layer on the major surface and forming an exterior layer comprising a fluid-permeable polymeric material on the base polymeric material and the array of structures. Next, the method includes forming a plurality of cavities in the polymeric material to form the dental appliance, wherein the dental appliance comprises an arrangement of cavities configured to receive one or more teeth.

In another aspect, the present disclosure provides a dental appliance, comprising a base polymeric substrate comprising a plurality of cavities for receiving one or more teeth and an array of structures on the substrate forming a discontinuous pattern, with the structures comprise a hardened resin and a therapeutic agent. The appliance further includes an exterior, fluid-permeable polymeric material layer on the structures and substrate.

In another aspect, the present disclosure provides a thermoformable film, comprising: a base polymeric substrate, an array of structures on the substrate forming a discontinuous pattern, wherein the structures comprise a hardened resin and a therapeutic agent and an exterior, ion-permeable polymeric material layer on the structures and substrate.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

Like symbols in the drawings indicate like elements.

DETAILED DESCRIPTION

Figure 1:
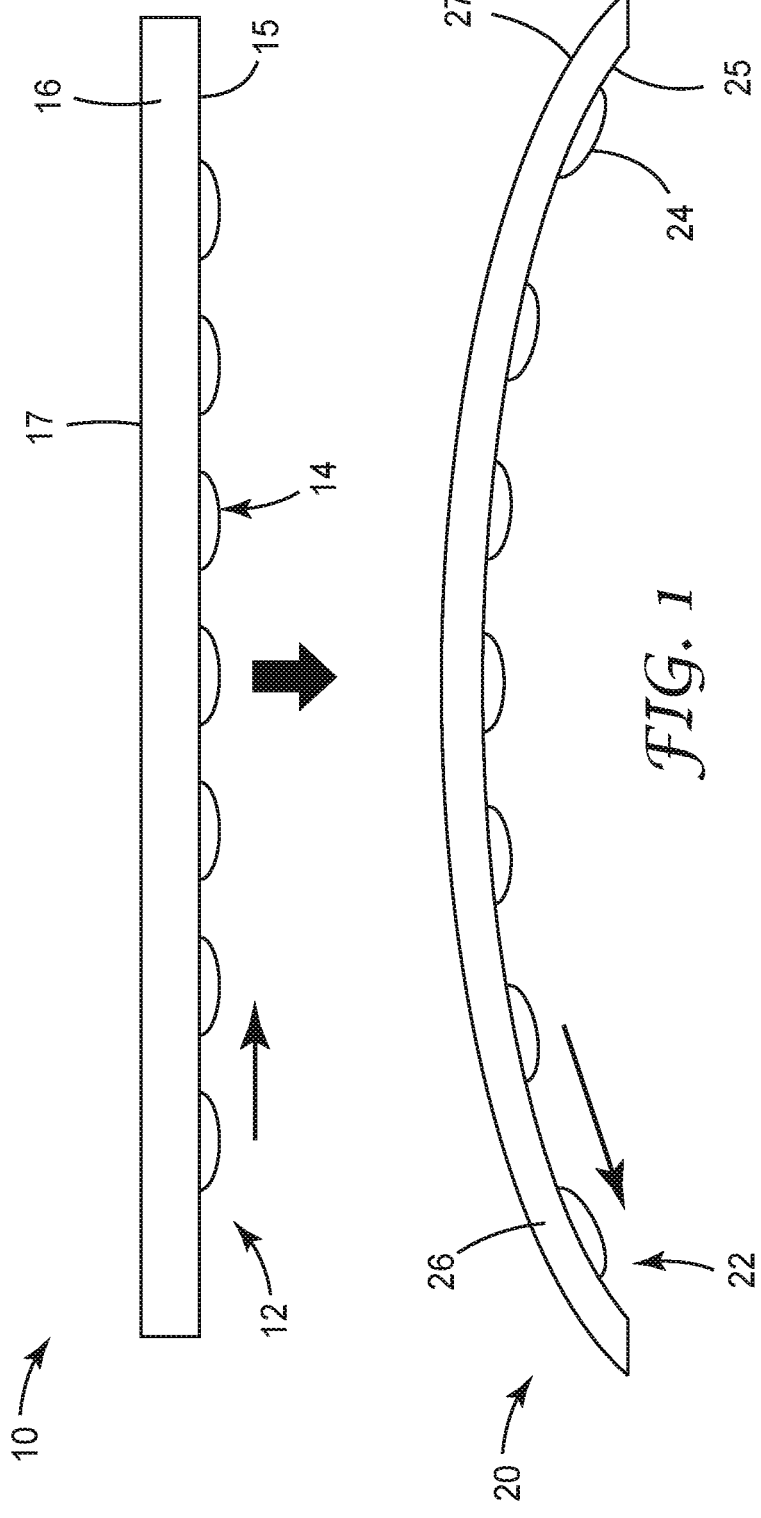
FIG. 1 is a schematic cross-sectional view of an intermediate material for making a dental appliance, the material having an arrangement of surface structures.

FIG. 1 is a schematic depiction of intermediate polymeric sheet construction 10 that may be used in the formation of a dental appliance. Dental appliances include structures other than a tray (e.g., a spring aligner as set forth U.S. Pat. No. 10,426,574 (Puttler et al.)), but the following description will focus on orthodontic aligner trays and retainer trays. A pattern 12 including discrete unhardened liquid regions 14 of a hardenable liquid composition is deposed on at least one major surface 15, 17 of a polymeric film substrate 16. Any suitable deposition or patterning technique may be used to transfer the liquid composition to the substrate 16, and examples include, but are not limited to, screen printing, flexographic printing, ink jet printing, gravure printing, pad printing, and combinations thereof. In the present application the term discrete refers to individual liquid regions that are free-standing, separate and distinct from one another, and do not share an edge-to-edge border. As will be described in more detail below, the liquid regions 14 are subsequently hardened to form a pattern 22 of discrete structures 24 on either or both major surfaces 25, 27 of the substrate 26. The pattern 22 of discrete structures 24 substantially corresponds to the pattern 12 of discrete liquid regions 14. The liquid regions 14 may be hardened to form the structures 24 prior to, during, or after, the substrate 16 is formed into a dental appliance 20 that includes a plurality of cavities (not shown in FIG. 1) configured to retain one or more teeth of a patient.

The substrate 16 may be selected from any suitable elastic polymeric material that is moldable to form a dental appliance, and once molded is generally conformable to a patient's teeth. The substrate 16 may be transparent, translucent, or opaque. In some embodiments, the substrate 16 is a clear or substantially transparent polymeric material that may include, for example, one or more of amorphous thermoplastic polymers, semi-crystalline thermoplastic polymers and transparent thermoplastic polymers chosen from polycarbonate, thermoplastic polyurethane, acrylic, polysulfone, polyprolylene, polypropylene/ethylene copolymer, cyclic olefin polymer/copolymer, poly-4-methyl-1-pentene or polyester/polycarbonate copolymer, styrenic polymeric materials, polyamide, polymethylpentene, polyetheretherketone, polyimide, ethylene vinyl acetate (EVA), polyethylene naphthalate (PEN), polycyclohexylenedimethylene terephthalate (PCT), and combinations thereof. Suitable semi-crystalline polymers can include polyesters and copolyesters, which may include ethylene glycol on the polymer backbone, or be free of ethylene glycol. In another embodiment, the substrate 16 may be chosen from clear or substantially transparent semi-crystalline thermoplastic, crystalline thermoplastics and composites, such as polyamide, polyethylene terephthalate. polybutylene terephthalate, polyester/polycarbonate copolymer, polyolefin, cyclic olefin polymer, styrenic copolymer, polyetherimide, polyetheretherketone, polyethersulfone, polytrimethylene terephthalate, and mixtures and combinations thereof. In some embodiments, the substrate 16 is a polymeric material chosen from polyethylene terephthalate, polyethylene terephthalate glycol, polycyclohexylenedimethylene terephthalate glycol, and mixtures and combinations thereof. One example of a commercially available material suitable as the elastic polymeric material for the substrate 16, which is not intended to be limiting, is polyethylene terephthalate (polyester with glycol additive (PETg)). Suitable PETg resins can be obtained from various commercial suppliers such as, for example, Eastman Chemical, Kingsport, TN; SK Chemicals, Irvine, CA; DowDuPont, Midland, MI; Pacur, Oshkosh, WI; and Scheu Dental Tech, Iserlohn, Germany.

The substrate 16 may be made of a single polymeric material or may include multiple layers of the same or different polymeric materials. Single and multilayer materials well suited for use as substrates of the present disclosure may be found, for example, in International Publication No. WO/2020/225657 and U.S. Provisional Patent Application No. 63/091,144, owned by the present assignee. The substrate 16 can be arranged in alternate layers such as, for example, in the arrangements ABA, BAB, BA, AB, etc.

In various embodiments, the substrate can include at least 5 polymeric layers, with softer polymeric interior layers disposed between a harder polymeric core layer and two harder polymeric outer layers. The hard core layer can enhance dimensional stability, while the softer middle layers positioned close to the outer skin layers can improve patient comfort and strain recovery. At least the softer middle layers can include a semi-crystalline polymer, typically an elastomer. In various embodiments, the soft polymeric interior layers have a flexural modulus lower than about 1 GPa, a glass transition temperature of less than about 0° C., and a vicat softening temperature of greater than 65° C. In various embodiments, the hard polymer core layer and the outer layers have a flexural modulus greater than 1.3 GPa and a thermal transition temperature in the range of about 70° C. to about 145° C. In various embodiments, the multilayered laminate dental appliance has an effective flexural modulus in the range of about 0.8 GPa to about 1.5 GPa, as well as excellent interfacial adhesion of greater than about 150 grams per inch (6 grams per mm).

In various embodiments, the substrate 16 has a thickness of less than 1 mm, but varying thicknesses may be used depending on the application of the orthodontic appliance 100. In various embodiments, the substrate 16 has a thickness of about 50 μm to about 3,000 μm, or about 300 μm to about 2,000 μm, or about 500 μm to about 1,000 μm, or about 600 μm to about 700 μm.

In one embodiment, the substrate 16 is a substantially transparent polymeric material, which in this application refers to materials that pass light in the wavelength region sensitive to the human eye (about 0.4 micrometers (μm) to about 0.75 μm) while rejecting light in other regions of the electromagnetic spectrum. In some embodiments, the substrate 16 is substantially transparent to visible light of about 400 nm to about 750 nm at a thickness of about 50 μm to about 1000 μm. In various embodiments, the visible light transmission through the combined thickness of the substrate is at least about 75%, or about 85%, or about 90%, or about 95%, or about 99%. In various embodiments, the substrate 16 has a haze of about 0% to about 20%, or about 1% to about 10%, or about 3% to about 8%. In various embodiments, the substrate 16 has a clarity of about 75% to about 100%, or about 85% to about 99%, or about 90% to about 95%.

The light transmission can be determined by ISO 13468-1:2019 or ASTM D1003-13 using CIE illuminate C and the Expected haze can be determined using ISO 14782-1:1999 or ASTM D1003-13 using CIE illuminate C. Some embodiments have a light transmission of at least about 50%. Some embodiments have a light transmission of at least about 75%. Some embodiments have a haze of no greater than 15 or no greater than 10%. Some embodiments have a haze of no greater than 5%. Some embodiments have a haze of no greater than 2.5%. The haze of the substrate of certain presently preferred embodiments is less than 10% and the light transmission of substrate is greater than 80%.

In some embodiments, the major surface of the polymeric sheet to which the liquid regions 14 are applied may optionally be chemically or mechanically treated prior to applying the hardenable liquid composition to, for example, enhance adhesion between the surface 15, 17 and the liquid regions 14. Examples of suitable treatments include, but are not limited to, corona treatments, ozonation, application of silane coupling agents, application of primers, application of adhesives, and combinations thereof.

In various embodiments, the discrete liquid regions 14 may form a continuous or a discontinuous array over the surfaces 15 or 17, or both. For example, some areas of the surfaces 15, 17 may be free of the liquid regions 14, while other areas have a dense arrangement of liquid regions 14. In another example embodiment, various areas of the surfaces 15, 17 may have liquid regions 14 with varying shapes and feature spacings. The sizes and shapes of the liquid regions 14 can vary widely, and the liquid regions 14 need not be the same size or shape in a particular area of the surfaces 15, 17, or over the entire surfaces 15, 17. For example, in some embodiments, the liquid regions 14 can form an aesthetic pattern, an image, a logo, a bar code, a QR code, and the like. In other embodiments, the liquid regions 14 simply form an array of dots over all or a portion of either or both of the surfaces 15, 17. In some embodiments, the liquid regions 14 may be applied on the substrate 16 in an array with sizes and feature spacings such that the visible light transmission through the thickness of the substrate and the liquid regions is at least about 75%, or about 85%, or about 90%, or about 95%. In various embodiments, which are provided as non-limiting examples, the liquid regions are applied to maintain sufficient substrate transparency, and at least about 20% of the surface 15 is free of liquid regions, or about 50%, about 75%, about 90%, or about 98%.

In various embodiments, areas of the surfaces 15, 17 may include liquid regions 14 of differing sizes, shapes or compositions, and in some embodiments, two or more different configurations of the liquid regions 14 can be deposited on at least a portion of the surfaces 15, 17. For example, liquid regions 14 with a first shape or size can be disposed on a first area of the surface 15, and liquid regions 14 with a second shape or size, different from the first shape or size, can be disposed in a second area of the surface 15.

In various embodiments, the liquid regions 14 can have varying cross-sectional shapes, which can be the same or different from the cross-sectional shapes of liquid regions in other areas on the surfaces 15, 17. In some embodiments, the liquid regions 14 are have a substantially hemispherical cross-sectional shape, and appear as arrays of dots on the surfaces 15, 17, and in other embodiments may have any cross-sectional shape such as squares, triangles, rectangles, and the like. In other embodiments, the liquid regions 14 can have an appearance in a plan view that is different from the cross-sectional shape. For example, in some embodiments as discussed in more detail below, the liquid regions can be further structured after the liquid regions are formed so that the plan view shape is different from the cross-sectional shape. In one example that is not intended to be limiting, the liquid regions 14 can appear circular in the plan view, but could have a cross-sectional shape of a triangle The liquid regions 14 can be uniformly arranged or randomly distributed in some areas on the surfaces 15, 17, and randomly distributed on other areas if the surfaces 15, 17. For example, the liquid regions 14 can be arranged uniformly on the first surface 15 and distributed randomly on the second major surface 17. In various embodiments, the height of the liquid regions 14 above the surfaces 15, 17, the width and length on the surface 15, 17, or both, can vary between areas of the surfaces 15, 17, and even can vary within a selected area.

In some embodiments, which are not intended to be limiting, the liquid regions 14 include a base having at least one microscale cross-sectional dimension. In various example embodiments, the liquid regions 14 can include abase on the surfaces 15, 17 having cross-sectional dimensions of about 25 μm to about 1000 μm, or about 100 μm to about 300 μm, or about 150 μm to about 250 μm.

In some embodiments, which are provided as an example, the liquid regions 14 have a feature spacing (i.e., the center to center distance between adjacent liquid regions) of about 100 μm to about 2000 μm or about 750 μm to about 1500 μm, or about 800 μm to about 1300 μm. In some embodiments, which are not intended to be limiting, the liquid regions 14 are present on the surfaces 15, 17 at about 10 to about 5000 dots per inch (dpi), or about 25 dpi to about 1000 dpi, or about 100 dpi to about 300 dpi.

In some example embodiments, the liquid regions 14 have a characteristic length of about 250 μm to about 2500 μm, or about 500 μm to about 1500 μm, or about 750 μm to about 1400 μm. In some example embodiments, the liquid regions 14 have an aspect ratio of about 0.0005 to about 0.01, or about 0.005 to about 0.05, or about 0.10 to about 0.20. In the present application, the term aspect ratio means a ratio of the height to the width of the discrete features.

The liquid regions 14 are formed from a hardenable liquid resin composition, which in some embodiments may further include at least one therapeutic agent in the resin matrix. In this application the term therapeutic agent refers to compounds that that can have a beneficial effect in the mouth of the patient. Examples of suitable therapeutic agents for the hardenable resin composition include, but are not limited to, fluoride sources, whitening agents, anti-cavity agents (e.g., xylitol), re-mineralizing agents (e.g., calcium phosphate compounds), enzymes, breath fresheners, anesthetics, clotting agents, acid neutralizers and pH control agents, ion-recharging agents, chemotherapeutic agents, immune response modifiers, thixotropes, polyols, anti-inflammatory agents, antimicrobial agents, antifungal agents, agents for treating xerostomia, desensitizers, and the like, of the type often used in dental compositions. Combinations of any of the above therapeutic agents may be used.

In some embodiments, suitable therapeutic agents include re-mineralizing agents such as calcium, phosphorous, and fluoride compounds.

For example, in some embodiments, suitable calcium compounds in the hardenable liquid resin composition include, but are not limited to, calcium chloride, calcium carbonate, calcium caseinate, calcium chloride, calcium citrate, calcium glubionate, calcium gluceptate, calcium glycerophosphate, calcium gluconate, calcium hydroxide, calcium hydroxyapatite, calcium lactate, calcium oxalate, calcium oxide, calcium pantothenate, calcium phosphate, calcium polycarbophil, calcium propionate, calcium pyrophosphate, calcium sulfate, and mixtures and combinations thereof. These compounds have been found to minimize demineralization of calcium hydroxyapatite at the surface of the tooth of a patient.

In some embodiments, the tooth re-mineralizing compounds in the hardenable liquid resin composition include phosphate compounds. Suitable phosphate compounds include, but are not limited to, aluminum phosphate, bone phosphate, calcium phosphate, calcium orthophosphate, calcium phosphate dibasic anhydrous, calcium phosphate-bone ash, calcium phosphate dibasic dihydrate, calcium phosphate dibasic anhydrous, calcium phosphate dibasic dihydrate, calcium phosphate tribasic, dibasic calcium phosphate dihydrate, dicalcium phosphate, neutral calcium phosphate, precipitated calcium phosphate, tertiary calcium phosphate, tricalcium phosphate, whitlockite, magnesium phosphate, potassium phosphate, dibasic potassium phosphate, dipotassium hydrogen orthophosphate, dipotassium monophosphate, dipotassium phosphate, monobasic potassium phosphate, potassium acid phosphate, potassium biphosphate, potassium dihydrogen orthophosphate, potassium hydrogen phosphate, sodium phosphate, anhydrous sodium phosphate, dibasic sodium phosphate, disodium hydrogen orthophosphate, disodium hydrogen orthophosphate dodecahydrate, disodium hydrogen phosphate, disodium phosphate, and sodium orthophosphate.

Fluoride compounds incorporated into the mineral surface of a tooth help inhibit the demineralization of enamel and protect the tooth. Fluoride compounds absorbed into mineral surfaces of a tooth attract calcium and phosphate ions from saliva, or other sources, which results in the formation of fluorapatite and protects the tooth against demineralization. While not wishing to be bound by any theory, currently available evidence indicates that fluorapatite exhibits lower solubility than naturally occurring hydroxyapatite, which can help resist the inevitable acid challenge that teeth face daily.

Orthodontic patients are considered high risk for cavities over the course of their treatment. Commercial fluoride varnishes are very sticky by design and typically last a few hours on the enamel once applied. For an orthodontic patient wearing a dental appliance such as an aligner tray, this is undesirable since the varnish can interfere with the fit of the aligners on the arches of the patient, as well as adhere to the plastic that the aligners are made from and permanently warp or deform them. In one embodiment, for example, the liquid regions on the structured surface 16 can be configured to deliver, when subsequently hardened, beneficial fluoride over a typical wear time for an alignment tray set (for example, 7 days), without compromising the fit of the alignment tray for the patient or ruining the polymeric material from which the alignment tray is made.

In some embodiments, the calcium compounds, phosphate compounds, fluoride compounds or combinations thereof, are present in the liquid regions in an amount sufficient such at least one of calcium, phosphate or fluoride can substantially reduce or prevent demineralization on the surface of the teeth of the patient during or exceeding a predetermined wear time.

In another embodiment, the therapeutic agents in the hardenable liquid resin composition include compounds selected to reduce the bacteria on at least one of the surfaces 25, 27 of the dental appliance 20. Suitable antibacterial or biofilm-reducing compounds include, but are not limited to, biocompatible metals and metal oxides $MO_x$ such as silver, silver oxide, copper oxide, gold oxide, zinc oxide, magnesium oxide, titanium oxide, chromium oxide, and mixtures, alloys and combinations thereof.

The liquid regions 14 and corresponding structures 24 can include any antimicrobially effective amount of the metal or the metal oxide $MO_x$. In various embodiments, which are not intended to be limiting, the liquid regions 14 can include less than 100 mg, less than 40 mg, less than 20 mg, or less than 5 mg $MO_x$ per 100 cm$^2$. The metal oxide can include, but is not limited to, silver oxide, copper oxide, gold oxide, zinc oxide, magnesium oxide, titanium oxide, chromium oxide, and mixtures, alloys and combinations thereof. In some embodiments, which are not intended to be limiting, the metal oxide can be chosen from AgCuZnOx, Ag doped ZnOx, Ag doped AZO, Ag doped TiO2, Al doped ZnO, and TiOx.

In some embodiments, the liquid regions 14 and the corresponding structures 24 can include one or more antibacterial agents. Examples of suitable antibacterial agents can include, but are not limited to, aldehydes (glutaraldehyde, phthalaldehyde), salts of phenolics or acids, chlorhexidine or its derivatives (including acid adducts such as acetates, gluconates, chlorides, nitrates, sulfates or carbonates), and combinations thereof.

Non-limiting examples of suitable antibacterial agents for the hardenable liquid resin composition include: zinc salts, zinc oxide, tin salts, tin oxide, benzalkonium chloride, hexitidine, long chain alkyl ammonium or pyridinium salts (e.g., cetypyridinium chloride, tetradecylpyridinium chloride), essential oils (e.g., thymol), furanones, chlorhexidine and salt forms thereof (e.g., chlorhexidine gluconate), sanguinarine, triclosan, stannous chloride, stannous fluoride, octenidine, non-ionic or ionic surfactants (e.g., quaternary ammonium compounds), alcohols (monomeric, polymeric, mono-alcohols, poly-alcohols), aromatic alcohols (e.g., phenol)), antimicrobial peptides (e.g., histatins), bactericins (e.g., nisin), antibiotics (e.g., tetracycline), aldehydes (e.g., glutaraldehyde) inorganic and organic acids (e.g., benzoic acid, salicylic acid, fatty acids, etc.) or their salts, derivatives of such acids such as esters (e.g., p-hydroxybenzoates or other parabens, glycerol esters of fatty acids such as lauricidin), silver compounds, silver salts, silver nanoparticles, peroxides (e.g., hydrogen peroxide), and combinations thereof.

In various embodiments, the therapeutic agents released from the structures 24 can vary between areas on the major surfaces of the dental appliance 20, and even within a single region. For example, the therapeutic agents released by the structures 24 in a first area of the surfaces 25, 27 of the dental appliance 20 can be different from the therapeutic agents released from the structures 24 in a second area of the surfaces 25, 27, e.g., fluoride in the first area and phosphate in the second are. In other examples, the therapeutic agents released from the structures 24 within the first area can differ from one another, e.g., fluoride and phosphate could be released from different structures 24 in the first area. In another embodiment, the therapeutic agents within the structures 24 can be released at a different concentration between regions and within a selected region.

In another embodiment, the therapeutic agents released from the liquid regions 14 and the corresponding structures 24 can be releasable over a predetermined patient wear time of the dental appliance 20. In some examples, the therapeutic agents may be released over a period of seconds, minutes, hours, days, weeks, or months. In addition, different regions of the orthodontic appliance can have therapeutic agents with varying predetermined release periods. For example, one region may have a release period on the order of seconds, and another different region may have a release period on the order of months.

In another embodiment, the liquid regions 14 and the corresponding structures 24 can be configured to absorb and release therapeutic agents. For example, calcium and/or phosphorus can be absorbed from saliva and released over time. In another example, fluoride, calcium, tin, and/or phosphorus can be absorbed from oral care products (e.g., toothpaste and rinse) and released over time.

In another embodiment, the hardened structures 24 can include an elastomeric polymeric material selected to, for example, ease placement and removal of the dental applicant in the mouth of the patient, improve comfort against the teeth or the tissues in the mouth of the patient, or enhance tray-to-dentition contact area leading to lower stress and/or effective force transfer from the dental article 20 for repositioning teeth. In some examples, elastomers can include polyisoprenes, polybutadienes, chloroprene rubbers, butyl rubbers, halogenated butyl rubbers, fluoropolymers, nitriles, ethylene propylene rubbers, ethylene propylene diene rubbers, silicone rubbers, polyacrylic rubbers, fluorosilicones, fluoroelastomers, polyether block amides, cholorsulfinated polyethylenes, and ethylene vinyl acetates.

In another embodiment, the liquid regions 14 or the corresponding structures 24 can be configured to facilitate unhindered flow of salivary fluids and other fluids to enhance and/or maintain hard tissue health. For example, when a tooth surface undergoes demineralization instigated by oral bacteria, dietary choices, xerostomia, etc., the structures 24 can provide open channels for the saliva to remineralize and hydrate the tooth surface.

Referring again to FIG. 1, the liquid regions 14 are deposited from a hardenable resin composition including a suitable resin matrix and an optional therapeutic compound incorporated into the resin matrix. In some embodiments, the resin material selected for the resin matrix has a glass transition temperature ($T_g$) higher than the $T_g$ of the substrate 16 on which the liquid regions are applied. In some cases, utilizing a hardenable liquid composition with a resin having a higher $T_g$ than the substrate can reduce or substantially eliminate distortion when the substrate is thermoformed into a dental appliance. In some embodiments, resins with a higher $T_g$ can provide liquid regions 14 with a greater height above a surface 15, 17, a greater particle loading, and combinations thereof.

Suitable resins for the hardenable liquid composition include, but are not limited to, epoxy resins (which contain cationically active epoxy groups), vinyl ether resins (which contain cationically active vinyl ether groups), ethylenically unsaturated compounds (which contain free radically active unsaturated groups, e.g., acrylates and methacrylates), and combinations thereof. Also suitable are polymerizable materials that contain both a cationically active functional group and a free radically active functional group in a single compound. Examples include epoxy-functional (meth)acrylates.

As used herein, ethylenically unsaturated compounds with acid functionality includes monomers, oligomers, and polymers having ethylenic unsaturation and acid and/or acid-precursor functionality. Acid-precursor functionalities include, for example, anhydrides, acid halides, and pyrophosphates. Ethylenically unsaturated compounds with acid functionality include, for example, α,β-unsaturated acidic compounds such as glycerol phosphate mono(meth)acrylates, glycerol phosphate di(meth)acrylates, hydroxyethyl (meth)acrylate (e.g., HEMA) phosphates, bis((meth)acryloxyethyl) phosphate, ((meth)acryloxypropyl) phosphate, bis((meth)acryloxypropyl) phosphate, bis((meth)acryloxy) propyloxy phosphate, (meth)acryloxyhexyl phosphate, bis ((meth)acryloxyhexyl) phosphate, (meth)acryloxyoctyl phosphate, bis((meth)acryloxyoctyl) phosphate, (meth)acryloxydecyl phosphate, bis((meth)acryloxydecyl) phosphate, 10-methacryloyloxydecyl dihydrogen phosphate (MDP monomer), caprolactone methacrylate phosphate, citric acid di- or tri-methacrylates, poly(meth)acrylated oligomaleic acid, poly(meth)acrylated polymaleic acid, poly(meth)acrylated poly(meth)acrylic acid, poly(meth)acrylated polycarboxyl-polyphosphonic acid, poly(meth)acrylated polychlorophosphoric acid, poly(meth)acrylated polysulfonate, poly (meth)acrylated polyboric acid, and the like, may be used as components in the hardenable resin system. Also, monomers, oligomers, and polymers of unsaturated carbonic acids such as (meth)acrylic acids, aromatic (meth)acrylated acids (e.g., methacrylated trimellitic acids), and anhydrides thereof can be used. Some compositions can include an ethylenically unsaturated compound with acid functionality having at least one P—OH moiety.

In some embodiments, the hardenable liquid resin composition may be photopolymerizable. Photopolymerizable compositions may include compounds having free radically active functional groups that may include monomers, oligomers, and polymers having one or more ethylenically unsaturated group. Suitable compounds contain at least one ethylenically unsaturated bond and are capable of undergoing addition polymerization. Such free radically polymerizable compounds include mono-, di- or poly-(meth)acrylates (i.e., acrylates and methacrylates) such as, methyl (meth) acrylate, ethyl acrylate, isopropyl methacrylate, n-hexyl acrylate, stearyl acrylate, allyl acrylate, glycerol triacrylate, ethyleneglycol diacrylate, diethyleneglycol diacrylate, triethyleneglycol dimethacrylate, 1,3-propanediol di(meth) acrylate, trimethylolpropane triacrylate, 1,2,4-butanetriol trimethacrylate, 1,4-cyclohexanediol diacrylate, pentaerythritol tetra(meth)acrylate, sorbitol hexacrylate, tetrahydrofurfuryl (meth)acrylate, bis[1-(2-acryloxy)]-p-ethoxyphenyldimethylmethane, bis[1-(3-acryloxy-2-hydroxy)]-p-propoxyphenyldimethylmethane, ethoxylated bisphenolA di(meth)acrylate, and trishydroxyethyl-isocyanurate trimethacrylate; (meth)acrylamides (i.e., acrylamides and methacrylamides) such as (meth)acrylamide, methylene bis-(meth)acrylamide, and diacetone (meth)acrylamide; urethane (meth)acrylates; the bis-(meth)acrylates of polyethylene glycols (e.g., molecular weight 200-500), copolymerizable mixtures of acrylated monomers such as those in U.S. Pat. No. 4,652,274 (Boettcher et al.), acrylated oligomers such as those of U.S. Pat. No. 4,642,126 (Zador et al.), and poly(ethylenically unsaturated) carbamoyl isocyanurates such as those disclosed in U.S. Pat. No. 4,648, 843 (Mitra); and vinyl compounds such as styrene, diallyl phthalate, divinyl succinate, divinyl adipate and divinyl phthalate. Other suitable free radically polymerizable compounds include siloxane-functional (meth)acrylates as disclosed, for example, in WO-00/38619 (Guggenberger et al.), WO-01/92271 (Weinmann et al.), WO-01/07444 (Guggenberger et al.), WO-00/42092 (Guggenberger et al.) and fluoropolymer-functional (meth)acrylates as disclosed, for example, in U.S. Pat. No. 5,076,844 (Fock et al.), U.S. Pat. No. 4,356,296 (Griffith et al.), EP-0373 384 (Wagenknecht et al.), EP-0201 031 (Reiners et al.), and EP-0201 778 (Reiners et al.). Mixtures of two or more free radically polymerizable compounds can be used if desired.

The polymerizable component in the hardenable liquid resin composition may also contain hydroxyl groups and free radically active functional groups in a single molecule. Examples of such materials include hydroxyalkyl (meth) acrylates, such as 2-hydroxyethyl (meth)acrylate and 2-hydroxypropyl (meth)acrylate; glycerol mono- or di-(meth) acrylate; trimethylolpropane mono- or di-(meth)acrylate; pentaerythritol mono-, di-, and tri-(meth)acrylate; sorbitol mono-, di-, tri-, tetra-, or penta-(meth)acrylate; and 2,2-bis [4-(2-hydroxy-3-methacryloxypropoxy)phenyl]propane (bisGMA). Suitable ethylenically unsaturated compounds are also available from a wide variety of commercial sources, such as Sigma-Aldrich, St. Louis. Mixtures of ethylenically unsaturated compounds can be used if desired.

Particularly useful photopolymerizable components for use in the hardenable liquid resin composition include PEGDMA (polyethyleneglycol dimethacrylate having a molecular weight of approximately 400), bisGMA, UDMA (urethane dimethacrylate), GDMA (glycerol dimethacrylate), TEGDMA (triethyleneglycol dimethacrylate), bisEMA6 as described in U.S. Pat. No. 6,030,606 (Holmes), and NPGDMA (neopentylglycol dimethacrylate). Various combinations of the polymerizable components can be used if desired.

For example, some embodiments of the resin composition can include approximately at least 10, 20, 30, 40, 50, 60, 70, 80, 85, 90, 92, 95, 96, 98 or 99% by weight of photopolymerizable components based on the total weight of the composition. In some embodiments, the resin composition can include approximately less than 10, 20, 30, 40, 50, 60, 70, 80, 85, 90, 92, 95, 96, 98 or 99% by weight of photopolymerizable components based on the total weight of the composition. In some embodiments, the resin composition can include a range, e.g., between approximately 10% by weight to approximately 99% by weight, between approximately 10% by weight to approximately 50% by weight, between approximately 50% by weight to approximately 99% by weight, or between approximately 40% by weight to approximately 70% by weight of photopolymerizable components based on the total weight of the composition.

In one embodiment, the hardenable resin composition, such as photopolymerizable components of one or more ethylenically unsaturated compounds, includes approximately at least 10, 15, 20, 25, 30, or 40% by weight based on the total weight of the resin composition. In some embodiments, the resin composition, such as photopolymerizable components of one or more ethylenically unsaturated compounds, includes approximately less than 60, 70, 75, 80, 85, or 90% by weight based on the total weight of the resin composition. In other embodiments, the resin composition, such as photopolymerizable components of one or more ethylenically unsaturated compounds, includes a range, e.g., between approximately 10% by weight to approximately 90% by weight, between approximately 10% by weight to approximately 40% by weight, between approximately 60% by weight to approximately 90% by weight, or between approximately 40% by weight to approximately 70% by weight based on the total weight of the resin composition.

In one embodiment, the hardenable resin composition, such as photopolymerizable components of one or more ethylenically unsaturated compounds with acid functionality and an initiator system, includes approximately at least 10, 15, 20, 25, 30, or 40% by weight based on the total weight of the resin composition. In some embodiments, the resin composition, such as photopolymerizable components of one or more ethylenically unsaturated compounds with acid functionality and an initiator system, includes approximately less than 60, 70, 75, 80, 85, or 90% by weight based on the total weight of the resin composition. In other embodiments, the resin composition, such as photopolymerizable components of one or more ethylenically unsaturated compounds with acid functionality and an initiator system, includes a range, e.g., between approximately 10% by weight to approximately 90% by weight, between approximately 10% by weight to approximately 40% by weight, between approximately 60% by weight to approximately 90% by weight, or between approximately 40% by weight to approximately 70% by weight based on the total weight of the resin composition.

Suitable photoinitiators (i.e., photoinitiator systems that include one or more compounds) for polymerizing free radically photopolymerizable resin compositions include binary and tertiary systems. Typical tertiary photoinitiators include an iodonium salt, a photosensitizer, and an electron donor compound as described in U.S. Pat. No. 5,545,676 (Palazzotto et al.). Iodonium salts can include the diaryl iodonium salts, e.g., diphenyliodonium chloride, diphenyliodonium hexafluorophosphate, diphenyliodonium tetrafluoroborate, and tolylcumyliodonium tetrakis(pentafluorophenyl)borate. Photosensitizers can include monoketones and diketones that absorb some light within a range of 400 nm to 520 nm, or 450 nm to 500 nm. Compounds can include alpha diketones that have some light absorption within a range of 400 nm to 520 nm or of 450 nm to 500 nm. Compounds can include camphorquinone, benzil, furil, 3,3, 6,6-tetramethylcyclohexanedione, phenanthraquinone, 1-phenyl-1,2-propanedione and other 1-aryl-2-alkyl-1,2-ethanediones, and cyclic alpha diketones. Electron donor compounds can include substituted amines, e.g., ethyl dimethylaminobenzoate. Other suitable tertiary photoinitiator systems useful for photopolymerizing cationically polymerizable resins are described, for example, in U.S. Pat. Publication No. 2003/0166737 (Dede et al.).

Other suitable photoinitiators for polymerizing free radically photopolymerizable compositions include the class of phosphine oxides that typically have a functional wavelength range of 380 nm to 1200 nm. Phosphine oxide free radical initiators with a functional wavelength range of 380 nm to 450 nm can include acyl and bisacyl phosphine oxides such as those described in U.S. Pat. No. 4,298,738 (Lechtken et al.), U.S. Pat. No. 4,324,744 (Lechtken et al.), U.S. Pat. No. 4,385,109 (Lechtken et al.), U.S. Pat. No. 4,710,523 (Lechtken et al.), and U.S. Pat. No. 4,737,593 (Ellrich et al.), U.S. Pat. No. 6,251,963 (Kohler et al.); and EP Application No. 0 173 567 A2 (Ying).

In one embodiment, the hardenable resin composition includes an effective amount from approximately 0.1 wt % to approximately 5.0 wt % of one or more photoinitiators, based on the total weight of the resin composition.

The hardenable resin compositions can also contain fillers. Fillers may be selected from one or more of a wide variety of materials suitable for incorporation in compositions used for dental applications, such as fillers currently used in dental restorative compositions, pigments, and the like.

The filler can be finely divided. The filler can have a unimodial or polymodial (e.g., bimodal) particle size distribution. In some examples, the maximum particle size (the largest dimension of a particle, typically, the diameter) of the filler can be less than 20 micrometers, less than 10 micrometers, or less than 5 micrometers. In some examples, the average particle size of the filler can be less than 0.1 micrometers or less than 0.075 micrometer.

The filler can be an inorganic material. It can also be a crosslinked organic material that is insoluble in the resin system and is optionally filled with inorganic filler. The filler should in any event be nontoxic and suitable for use in the mouth. The filler can be radiopaque or radiolucent, and in some embodiments is substantially insoluble in water.

Examples of suitable inorganic fillers are naturally occurring or synthetic materials including, but not limited to: quartz; nitrides (e.g., silicon nitride); glasses derived from, for example, Zr, Sr, Ce, Sb, Sn, Ba, Zn, and Al; feldspar; borosilicate glass; kaolin; talc; titania; pigments; low Mohs hardness fillers such as those described in U.S. Pat. No. 4,695,251 (Randklev); and submicron silica particles (e.g., pyrogenic silicas such as those available under the trade designations AEROSIL, including "OX 50," "130," "150" and "200" silicas from Degussa Corp., Akron, Ohio and CAB-O-SIL M5 silica from Cabot Corp., Tuscola, Ill.). Examples of suitable organic filler particles include filled or unfilled pulverized polycarbonates, polyepoxides, and the like.

Non-acid-reactive filler particles can include quartz, submicron silica, and non-vitreous microparticles of the type described in U.S. Pat. No. 4,503,169 (Randklev). Mixtures of these non-acid-reactive fillers are also contemplated, as well as combination fillers made from organic and inorganic materials. In some embodiments, the filler can be silane-treated zirconia-silica (Zr—Si).

For some embodiments that include filler, the compositions can include at least 1% by weight, at least 2% by weight, and at least 5% by weight filler, based on the total weight of the composition.

The hardenable liquid resin composition can also include a solvent or a liquid carrier, which can vary widely. In some embodiments, the solvents and liquid carriers are aqueous, or consist of water.

In some embodiments, the hardenable resin composition includes less than about 1% by weight of optional additives such as, for example, preservatives (for example BHT), flavoring agents, indicators, dyes, pigments, inhibitors, accelerators, viscosity modifiers, wetting agents, buffering agents, radical and cationic stabilizers (for example BHT), and the like, based on the total weight of the resin composition.

Suitable commercially available hardenable resin compositions include CLINPRO sealant available from 3M Company, St. Paul, MN, EMBRACE Pit & Fissure Sealant available from Pulpdent, Watertown, MA, GUARDIAN Sealant available from Kerr, Brea, CA, and ALFA-SEAL light cure Sealant available from Dental Technologies, Lincolnwood, IL.

The liquid regions 14 can be applied on the surfaces 15, 17 by any suitable deposition technique. In some non-limiting examples, screen printing is a printing technique in which a mesh is used to transfer a liquid composition, referred to as an ink, onto a substrate, except in areas made impermeable to the ink by a blocking stencil. A blade or squeegee is moved across the screen to fill the open mesh apertures with ink, and a reverse stroke then causes the screen to touch the substrate momentarily along a line of contact. This causes the ink to wet the substrate and be pulled out of the mesh apertures as the screen springs back after the blade has passed. One color is printed at a time, so several screens can be used to produce a multi-colored image or design. Screen printing is particularly useful in forming liquid regions 14 with varying heights or spacings above the surfaces 15, 17. For example, in some embodiments the spacing of apertures in the screen, or the thickness of the screen, or both, can be varied to form arrays of liquid regions with corresponding spacings or heights above the surfaces 15, 17.

In another non-limiting example, a flexographic print is made by creating a positive mirrored master of the required image as a 3D relief in a rubber or polymeric material, which is referred to as a flexographic printing plate. The image areas on the flexographic printing plate are raised above the non-image areas on the plate. Printing ink is transferred to the image areas of the flexographic plate via an anilox roll (composed of cells filled with ink, usually by a blading ink into the anilox roll cells), and then the ink is transferred to the substrate by contacting the "inked" flexographic plate to the substrate. Ink is only transferred from the relief features of the flexographic plate to the substrate.

Referring again to FIG. 1, as noted above, after printing the liquid regions 14 are subsequently at least partially hardened to form a pattern 22 of discrete structures 24 on either or both major surfaces 25, 27 of the substrate 26. The pattern 22 of the discrete structures 24 substantially corresponds to the pattern 12 of discrete liquid regions 14.

Figure 2:
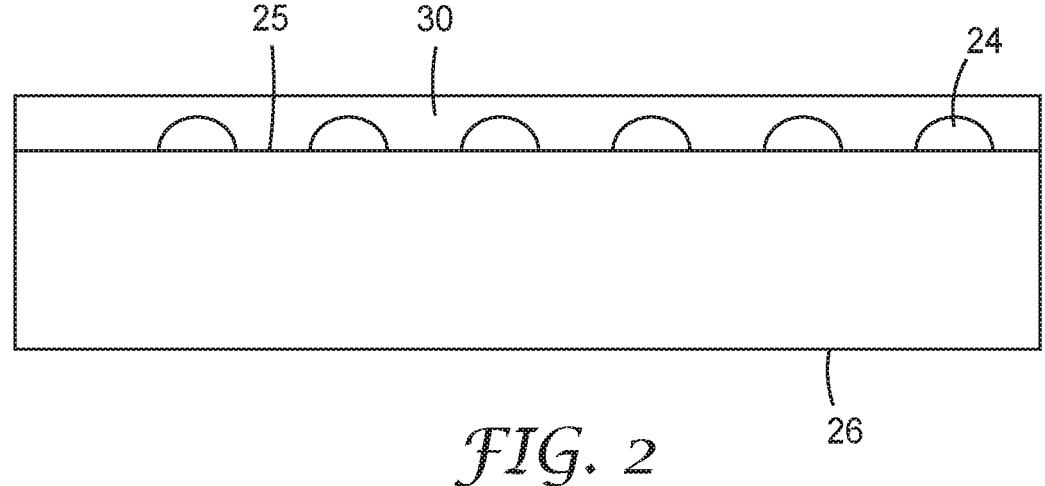
FIG. 2 is a schematic cross-sectional view of the intermediate material of FIG. 1 with an additional fluid permeable layer added to make a structured material formable into a dental appliance.

Referring now to FIG. 2, a therapeutic agent release layer 30 can be laminated to or otherwise created on the major surface 15 of the substrate 16 as well as the discrete structures. The therapeutic agent release layer 30 can assist in prolonging or regulating the release of the therapeutic agent in the discrete structure 24, ensuring the respective treatment remains or effective over a reasonable life of the formed dental appliance. The release layer includes a polymeric material that is substantially compatible with the substrate 16, meaning that it has sufficient interfacial adhesion to avoid delamination or degradation when formed into an appliance, as set out below, or when the formed appliance is used in a patient's mouth.

In some embodiments, the release layer 30 can include a (meth)acrylate or an acrylamide. In particularly preferred embodiments at present, the fluid permeable layer is a cationic copolymer based on dimethylaminoethyl methacrylate, butyl methacrylate, and methyl methacrylate. Such a cationic copolymer is available from Evonik Industries as EUDRAGIT E100, a copolymer of poly(butyl methacrylate-co-(2-dimethylaminoethyl) methacrylate-co-methyl methacrylate) with monomer ratio of 1:2:1 and a weight average molar mass of approximately MW 47,000 g/mol. A variety of other curable materials can be included in the polymer layer, such as, e.g., vinyl ethers, vinyl napthalene, acrylonitrile, and mixtures thereof.

In some embodiments, the release layer 30 can be the above polymers or mixtures with ion permeable property. Suitable polymers include acidic polymers, neutral polymers and basic polymers with different side functional groups.

In some embodiments, the acidic copolymer can include a copolymer of methacrylic acid and methyl methacrylate. In some other embodiments, the acidic copolymer can include Eudragit® S100 (marketed by Evonic Industries AG, Damstadt, Germany), Eudragit® L100 (marketed by Evonic Industries AG, Damstadt, Germany), Eudragit® L100-55 (marketed by Evonic Industries AG, Damstadt, Germany), AC210 (marketed by The Lubrizol Corporation, Wickliffe, Ohio, USA), or combinations thereof.

The weight average molecular weight of the acidic copolymer can be from about 5,000 to about 500,000. In other embodiments, the molecular weight of the neutral copolymer can be from about 10,000 to about 100,000.

The neutral acrylate monomeric units can include, but are not limited to, isobutyl acrylate, tert-butyl acrylate, 2-ethylhexyl acrylate, lauryl acrylate, lauryl/tridecyl acrylate, cetyl acrylate, stearyl acrylate, cyclohexyl acrylate, benzyl acrylate, isobornyl acrylate, 2-methoxyethyl acrylate, 2-ethoxyethyl acrylate, 2-ethoxyethoxyethyl, acrylate, 2-phenoxyethyl acrylate, tetrahydrofurfuryl acrylate, 2-hydroxyethyl acrylate, 2-hydroxypropyl acrylate, 4-hydroxybutyl acrylate, 1,4-butanediol acrylate, and combinations thereof. In some other embodiments, diacrylates can include the diacrylates of: 1,4-butanediol, 1,6-hexanediol, tetraethylene glycol, tripropylene glycol, and ethoxylated bisphenol-A. In other embodiments, triacrylate monomers include those of: trimethylol propane, ethoxylated, glyceryl propoxy, and pentaerythritol.

Neutral methacrylate monomeric units can also include, but are not limited to, methyl methacrylate, ethyl methacrylate, n-butyl methacrylate, isobutyl methacrylate, tert-butyl methacrylate, 2-ethylhexyl methacrylate, lauryl methacrylate, alkyl methacrylate, tridecyl methacrylate, stearyl methacrylate, cyclohexyl methacrylate, benzyl methacrylate, isobornyl methacrylate, 2-hydroxyethyl methacrylate, 2-hydroxypropyl methacrylate, dimethylaminoethyl methacrylate, diethylaminoethyl methacrylate, glycidyl methacrylate, tetrahydrofurfuryl methacrylate, allyl methacrylate, ethylene glycol methacrylate, triethylene glycol methacrylate, tetraethylene glycol methacrylate, 1,3-butyleneglycol methacrylate, 1,6-hexanediol methacrylate, trimethylopropane methacrylate, ethoxyethyl methacrylate and trifluoroethyl methacrylate, and combinations thereof.

In other embodiments, the neutral copolymer can include copolymers of ethyl acrylate, methyl methacrylate and methacrylic acid ester with quaternary ammonium groups.

In some embodiments, the neutral copolymer can include Eudragit RS100 (marketed by Evonic Industries AG, Damstadt, Germany), Eudragit RL 100 (marketed by Evonic Industries AG, Damstadt, Germany), and combinations thereof.

Neutral copolymers can be used as film formers with a flexible property and a low strength that maintain adhesion during scratching or tooth brushing. However, neutral copolymers often have poor solubility in water and/or alcohol based coating system. The acidic copolymer can, for example, help to dissolve the neutral copolymers in solvents system and the flexible neutral copolymers can help to form a tougher film and thus provide a good adhesion to dental structures.

In some embodiments, the weight average molecular weight of the neutral copolymer can be from about 10,000 to about 100,000.

In some embodiments, the composition of the release layer can comprise from about 15 to about 50 wt-% of sum of the acidic and neutral copolymers, based on the total weight of the composition. In some other embodiments, the composition can comprise from about 20 to about 48 wt-% of sum of the acidic and neutral copolymers, based on the total weight of the composition. In other embodiments, the composition can comprise from about 22 to about 37 wt-% of sum of the acidic and neutral copolymers, based on the total weight of the composition.

In some embodiments, the composition of the release layer used in the methods of the present disclosure can further include a basic copolymer having basic acrylate monomeric units, basic methacrylate monomeric units, or a combination thereof. The basic copolymer, for example, can be used to crosslink the acidic polymer by ionic interaction to improve mechanical properties.

The basic copolymer can include a copolymer containing dimethylaminoethyl methacrylate. In some other embodiments, the basic copolymer can include a copolymer based on dimethylaminoethyl methacrylate, butyl methacrylate, and methyl methacrylate. In other embodiments, the basic copolymer can be chosen from Eudragit E100 and other copolymer containing dimethylaminoethyl methacrylate for ionic crosslinking.

The weight average molecular weight of the basic copolymer can be from about 10,000 to about 100,000.

The composition of the release layer can comprise from about 0 to about 1.0 wt-% of the basic copolymer. In other embodiments, the composition comprises from about 0.1 to about 0.4 wt-% of the basic copolymer.

The weight ratio of the basic copolymer to the acidic polymer can be from about 0 to about 1:10. In other embodiments, the weight ratio of the basic copolymer to the acidic polymer can be from about 1:100 to about 1:15. Such a weight ratio, for example, can provide a good ionic cross-linking. When the weight ratio of the basic copolymer to the acidic polymer is too high, the interaction between the basic copolymer and the acidic polymer is too strong. As a result, the two copolymers form very high viscosity gels that cannot dissolve in the release layer composition and becomes very difficult to handle and mix.

In presently preferred implementations, the release layer 30 does not have a thickness greater than about ⅓ the thickness of the substrate, and in some embodiments no greater ⅙ the thickness of the substrate 16. A release layer 30 having a greater thickness may demonstrate insufficient flexibility during thermoforming or may fail to sufficiently retain the hardened structures on the substrate surface. Typically, the release layer has a thickness no greater than 5 mils (127 microns), a suitable thickness range between about 2 mils (50.8 microns) and 5 mils (127 microns).

After application of the exterior release layer 30, a plurality of cavities may then be formed in the substrate 16 to form the orthodontic appliance 20, wherein the cavities are configured to receive one or more teeth. The cavities may be formed by any suitable technique, including thermoforming, laser processing, chemical or physical etching, and combinations thereof. The liquid regions 14 may be hardened to form the structures 24 prior to, during, or after, the substrate 16 is formed into the dental appliance 20.

In some embodiments, the cavities are formed in the sheet of polymeric material 16 under processing conditions such that the pattern 22 and the structures 24 are not substantially distorted. For example, in some embodiments, the substrate 16 may be thermoformed at a temperature and pressure which distorts the structures 24 by less than about 100%, or less than about 50%, in any dimension (for example, diameter, height, and the like). In some embodiments, the substrate 16 may be thermoformed at a temperature and a pressure such that an image formed by the array of structures 22 is not substantially distorted, which means that the image is still recognizable at a normal viewing distance. In some embodiments, the conditions in the thermoforming step may be utilized to change a first pattern of the structures 24 into a second pattern of structures 24 different from the first pattern.

Figure 3:
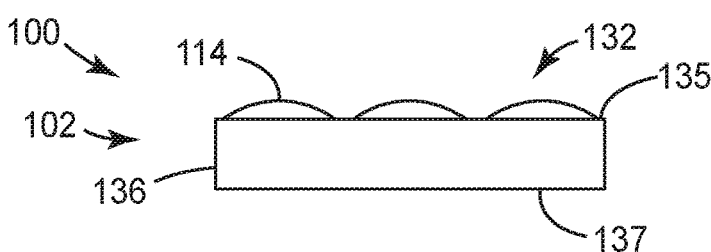
FIG. 3 is a schematic cross-sectional view of an indirect printing process for creating an arrangement of surface structures on the surface of a substrate.
Figure 3:
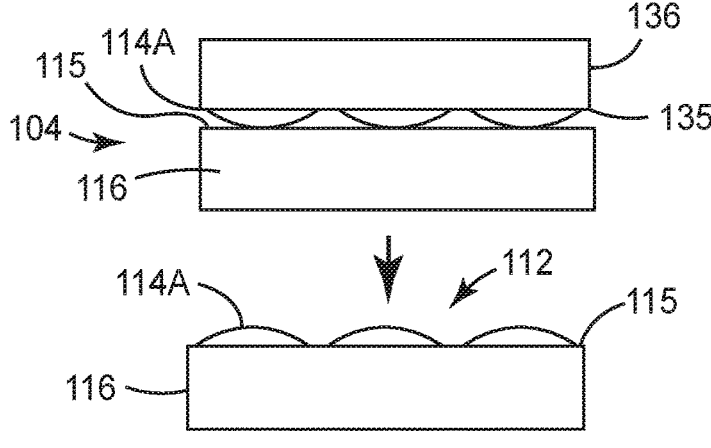
Figure 3:
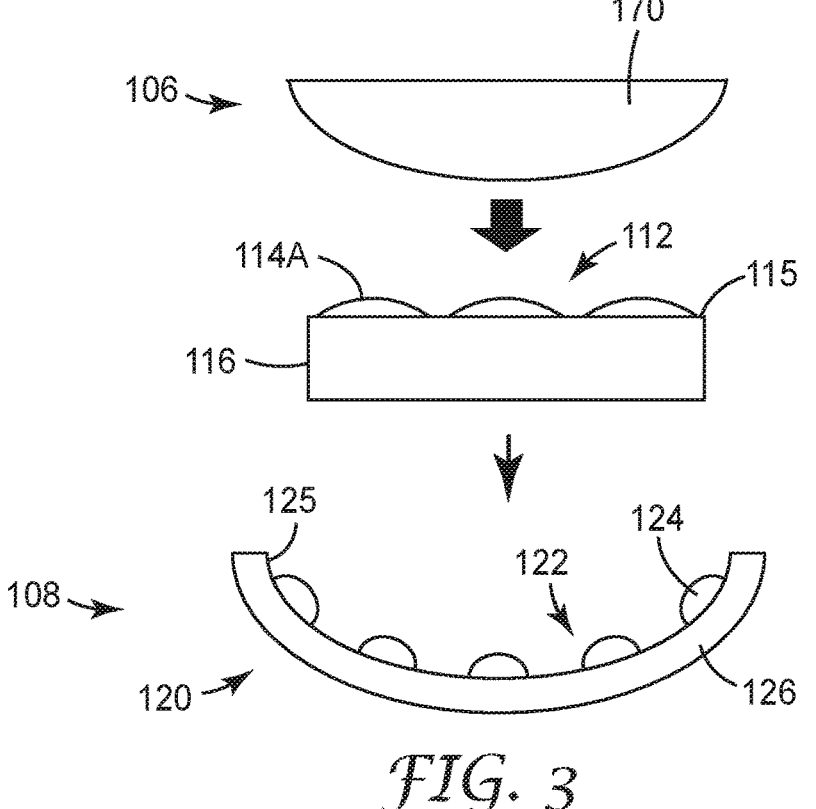

An indirect printing process 100, depicted schematically in FIG. 3, may be used to form a pattern of liquid regions on a substrate. In step 102, a pattern 132 including discrete liquid regions 114 of a hardenable liquid composition is printed on at least one major release surface 135, 137 of a substrate 136 by a suitable printing process such as, for example, screen printing, flexographic printing, and combinations thereof, as described in detail above.

The release surface 135 may be selected from any material from which the liquid regions 114 can release and cleanly transfer from the surface 135 to another substrate. In some embodiments, the release surface 135 is a surface of a low surface energy material such as, for example, a silicone. Silicone acrylates have been found to be particularly suitable. In another embodiment, the release surface 135 may include a release layer of a low surface energy material on a support (not shown in FIG. 3) such as, for example, a silicone layer overlying a paper support. In another embodiment, the release surface 135 may be a surface of a polymeric film. In some embodiments, the release properties of the surface of the polymeric film can optionally be chemically treated or modified by ozonation, corona discharge, application of silane coupling agents, application of primers, and combinations thereof, as needed for a particular application.

Referring now to step 104 of FIG. 3, the liquid regions 114 are at least partially hardened, or fully hardened to form structures 114A, and the release substrate 136 is applied to a substrate 116 such that the structures 114A contact a surface 115 of a substrate 116. In various embodiments, the release substrate 136 may be laminated to a polymeric film substrate 116, or a polymeric film substrate may be coated onto the release substrate 136.

The release substrate 136 is then peeled away and removed so that the structures 114A cleanly transfer from the release surface 135 to the surface 115 to form a pixelated pattern 112 of structures 114A thereon substantially corresponding to the pattern 132. The lamination step 104 may optionally include at least one of heating or pressure to facilitate the transfer of the at least partially hardened liquid regions 114A from the release surface 135 to the surface 115.

In steps 106 and 108, the substrate 116 including the pattern of structures 114A is contacted with a thermal mold 170 and formed into a dental appliance 120 that includes a plurality of cavities (not shown in FIG. 3) configured to retain one or more teeth of a patient. Once released from the mold 170, the dental appliance 120 includes a pattern 122 of discrete structures 124 on a surface 125 of a substrate 126. The pattern 122 of discrete structures 124 corresponds to the pattern 112 of discrete liquid regions 114 and structures 114A. When contacted with the thermal mold 170, the structures 114A are preferably sufficiently hardened such that the liquid regions 114A do not split between the mold 170 and surface 125 of the substrate 126.

Figure 4:
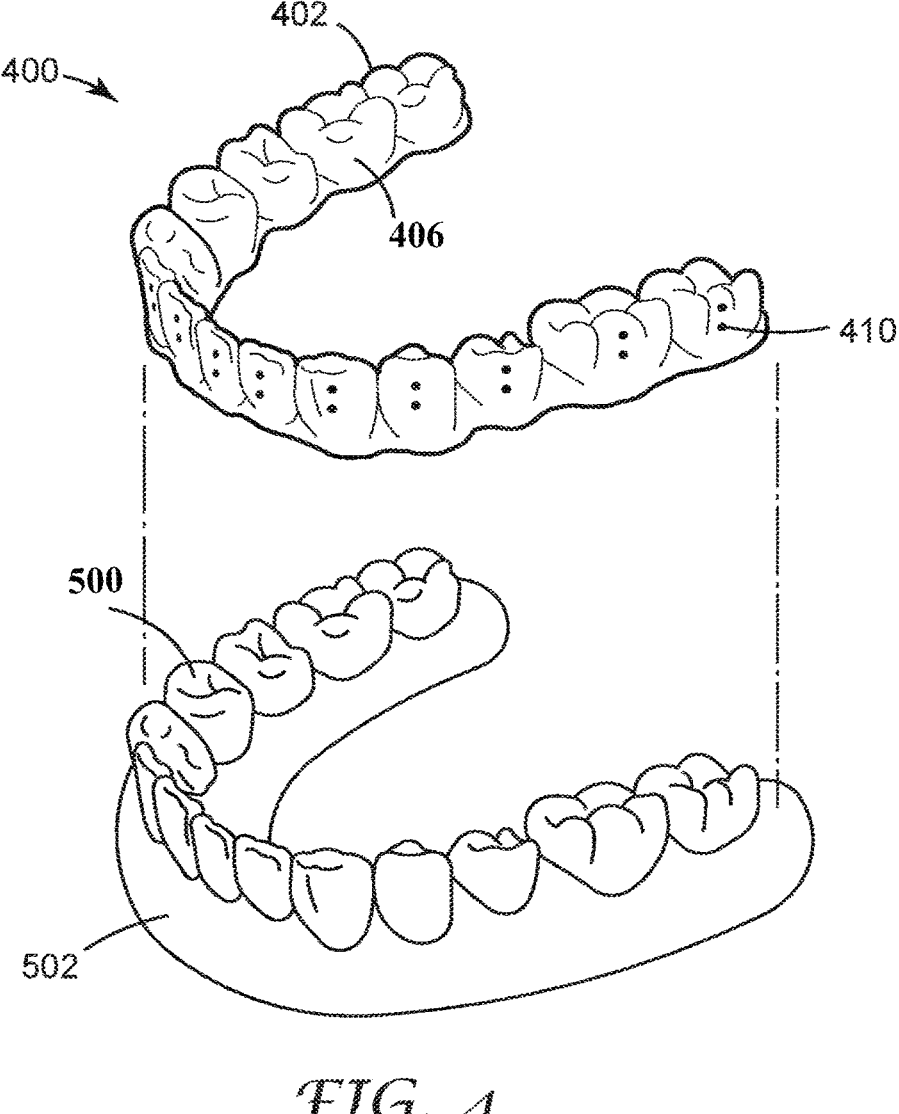
FIG. 4 is a schematic perspective view of a dental appliance as applied to teeth of a patient.

Referring now to FIG. 4, a shell 402 of an orthodontic appliance 400 is an elastic polymeric material that generally conforms to a patient's teeth 500, but that is slightly out of alignment with the patient's initial tooth configuration. In some embodiments, the shell 402 includes an exterior surface 406. In some embodiments, the shell 402 may be one of a group or a series of shells having substantially the same shape or mold, but which are formed from different materials to provide a different stiffness or resilience as need to move the teeth of the patient. In this manner, in one embodiment, a patient or a user may alternately use one of the orthodontic appliances during each treatment stage depending upon the patient's desired usage time or treatment time period for each treatment stage.

No wires or other means may be provided for holding the shell 402 over the teeth 500, but in some embodiments, it may be desirable or necessary to provide individual anchors on teeth with corresponding receptacles or apertures in the shell 402 so that the shell 402 can apply a retentive or other directional orthodontic force on the tooth which would not be possible in the absence of such an anchor.

The shells 402 may be customized, for example, for day time use and night time use, during function or non-function (chewing vs. non-chewing), during social settings (where appearance may be more important) and nonsocial settings (where the aesthetic appearance may not be a significant factor), or based on the patient's desire to accelerate the teeth movement (by optionally using the more stiff appliance for a longer period of time as opposed to the less stiff appliance for each treatment stage).

For example, in one aspect, the patient may be provided with a clear orthodontic appliance 400 that may be primarily used to retain the position of the teeth, and an opaque orthodontic appliance that may be primarily used to move the teeth for each treatment stage. Accordingly, during the daytime, in social settings, or otherwise in an environment where the patient is more acutely aware of the physical appearance, the patient may use the clear appliance. Moreover, during the evening or nighttime, in non-social settings, or otherwise when in an environment where physical appearance is less important, the patient may use the opaque appliance that is configured to apply a different amount of force or otherwise has a stiffer configuration to accelerate the teeth movement during each treatment stage. This approach may be repeated so that each of the pair of appliances are alternately used during each treatment stage.

Figure 5:
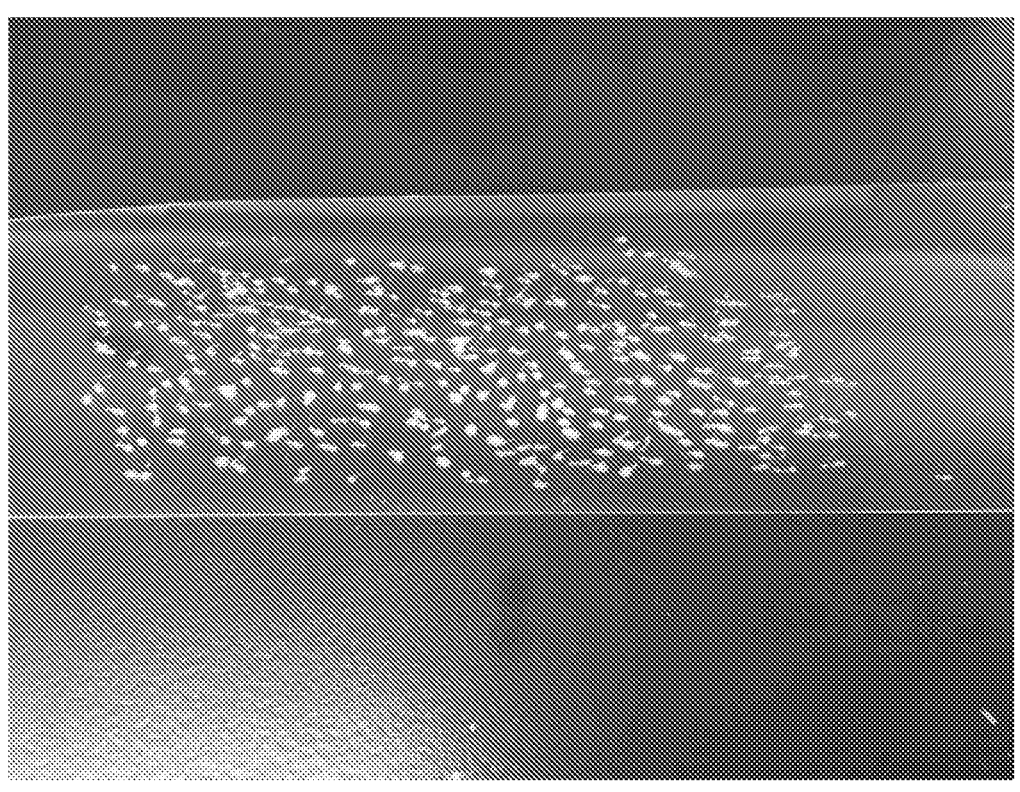
FIG. 5 is a high magnification image of the substrate of Example 1 depicting a pattern of discrete structures including dental sealant arranged on its surface.
Figure 6:
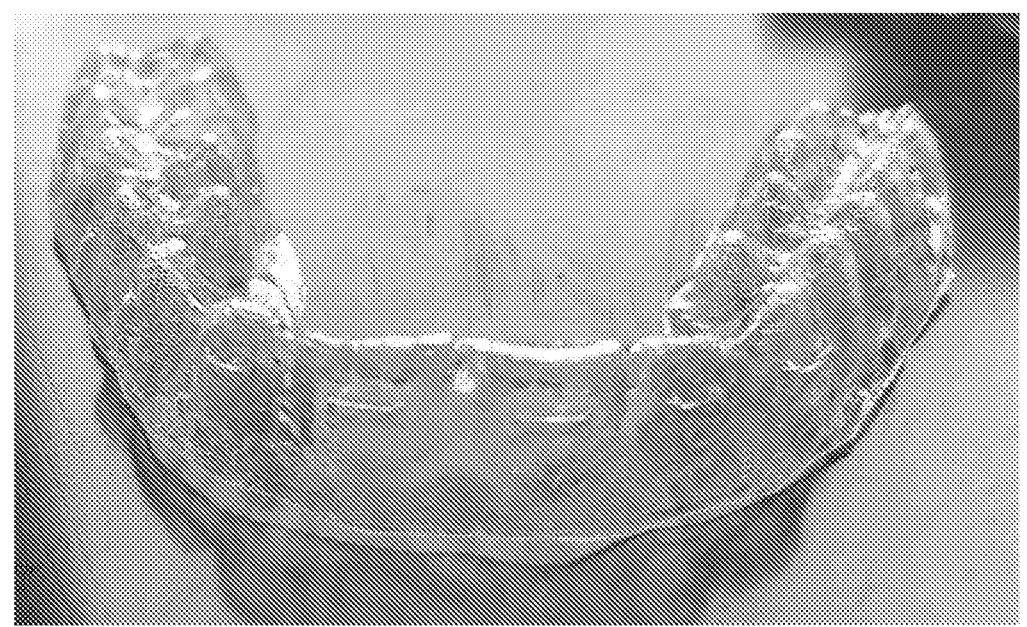
FIG. 6 is a photograph of a dental appliances formed from the substrate of Example 1 after the application of a fluid permeable release layer.

Referring again to FIG. 5, systems and methods in accordance with the various embodiments include a plurality of incremental position adjustment appliances, each formed from the same or a different material, for each treatment stage of orthodontic treatment. The orthodontic appliances may be configured to incrementally reposition individual teeth 500 in an upper or lower jaw 502 of a patient. In some embodiments, cavities are configured such that selected teeth will be repositioned, while others of the teeth will be designated as a base or anchor region for holding the repositioning appliance in place as the appliance applies the resilient repositioning force against the tooth or teeth intended to be repositioned.

Placement of the elastic positioner shell 402 over the teeth 500 applies controlled forces in specific locations to gradually move the teeth into the new configuration. Repetition of this process with successive appliances having different configurations eventually moves a patient's teeth through a series of intermediate configurations to a final desired configuration. During the movement process, structures 410 on the shell 402 provide a therapeutic or aesthetic function as described above.

In one example embodiment, the orthodontic alignment appliances may include a shell 402 made from a clear elastomeric polymeric material and are referred to as a clear tray aligner (CTA). In use, CTAs at stage one (N) of treatment are inserted over a dental arch with misaligned or malocclusion dentition at stage zero (N−1). The polymeric tray can be stretched to force the dentition to reposition into the next stage one (N). In other words, each aligner tray starts out "ill-fitting" on purpose. The polymeric tray may have a contoured surface to be able to engage and transfer forces to the dentition to effectively reposition the right tooth or set of teeth at a designated location, vector and time. Because of the ability of the polymeric tray to engage and/or transfer forces to the dentition while starting out "ill-fitting," the CTA can be effective and/or efficient appliance for, e.g., correcting Class II malocclusions, more comfortable to patient, easy to place/remove, and providing predictable treatment outcome. Therefore, a polymeric aligner tray with some flexibility at least in part because of its flat surface may be able to engage and/or transfer forces to the dentition to effectively reposition the right tooth or set of teeth at a designated location, vector and time. Because of the fit between the tooth or set of teeth, the CTA can be effective and/or efficient appliance for correcting Class II malocclusions and be comfortable to the patient, easy to place/remove, predictable treatment outcome, etc.

Embodiments will now be illustrated with reference to the following non-limiting examples.

EXAMPLES

TABLE 1

Materials

| Chemical abbreviation | Chemical Name | Vendor/Source |
|---|---|---|
| TEGDMA Resin | triethyleneglycol dimethacrylate | Sigma-Aldrich Corp., St. Louis, MO, USA |
| BHT | butylated hydroxytoluene (BHT) | Sigma-Aldrich Corp., St. Louis, MO, USA |
| CPQ | camphoroquinone | Sigma-Aldrich Corp., St. Louis, MO, USA |
| EDMAB | ethyl 4-(N,N-dimethylamino)benzoate | Sigma-Aldrich Corp., St. Louis, MO, USA |
| BisGMA | Bisphenol A diglycidyl ether dimethacrylate | Sigma-Aldrich Corp., St. Louis, MO, USA |
| TBATFB | Tetrabutylammonium tetrafluoroborate | Sigma-Aldrich Corp., St. Louis, MO, USA |

TABLE 1-continued

Materials

| Chemical abbreviation | Chemical Name | Vendor/Source |
|---|---|---|
| HLR-A | Hardenable Liquid Resin A was commercially available 3M CLINPRO Sealant | 3M Company, St. Paul, MN USA |
| HLR-B | Hardenable Liquid Resin B-transparent dental sealant was prepared in Example 2 | Preparation described in Example 2 |
| E100 | EUDRAGIT E100 (cationic copolymer based on dimethylaminoethyl methacrylate, butyl methacrylate, and methyl methacrylate; weight average molar mass is approximately MW 47,000 g/mol. E100 is the polymer of Poly(butyl methacrylate-co-(2-dimethylaminoethyl) methacrylate-co-methyl methacrylate) with monomer ratio of 1:2:1) | Evonic Industries AG, Damstadt, Germany |
| PETG | polyethylene terephthalate glycol (copolyester, grade: Eastar GN071) | Eastman Chemicals, Kingsport, TN |
| EtOH | Ethanol 200 proof | Sigma-Aldrich Corp., St. Louis, MO, USA |

PETG Film:

10 mil (0.254 mm) PETG film is obtained from Pacur, Oshkosh, Wisconsin.

Procedure for Thermoforming PETG Film into a Clear Tray Aligner:

The structured sheets of the examples below were formed into an article on a BIOSTAR VI pressure molding machine (Scheu-Dental GmbH, Iserlohn, Germany). To thermoform, a 125 mm diameter piece of structured sheet was heated for 25 seconds and then pulled down over a rigid-polymer model with coated surface facing the model. The BIOSTAR chamber behind the structured sheet was pressurized to 90 psi for 15 seconds of cooling time, after which the chamber was vented to ambient pressure and the formed article and arch model were removed from the instrument and cooled down to room temperature under ambient condition.

Example 1

Example 1 was prepared by dot coating HLR-A (3M CLINPRO Sealant) onto the extrusion cast PETG film. This was done by dripping tiny drops of HLR-A onto the PETG film. The drops, with an average approximate size of about 0.5 mm², formed discrete regions covering part of the PETG film and were separated from each other by gaps; the gaps having an average approximately distance of 1.0 mm millimeters. The HLR-A was then cured with blue LED light under nitrogen atmosphere for 2 minutes with power setting at 45V×8A.

A solution 25 wt % E100 in EtOH was then hand coated onto the PETG film previously dot coated with the HLR-A; covering the entire area of discrete regions of HLR-A dots. The coated film was then dried at room temperature to remove ethanol solvent. The coated film was then formed into a Clear Tray Aligner (CTA) by thermoforming against a dental arch positive mold as described above. The coated sheet and formed CTA were both colorless and clear.

Example 2

An alternative transparent sealant HLR-B was produced by mixing the ingredients listed Table 2 in the amounts shown, to form a clear solution. Example 2 was prepared in the same fashion as Example 1 except for using HLR-B instead of HLR-A. The coated sheet and formed CTA were both colorless and clear.

TABLE 2

| HLR-B Composition | |
| --- | --- |
| Ingredient | Amount (grams) |
| TEGDMA Resin | 42 |
| BHT | 0.05 |
| CPQ | 0.15 |
| EDMAB | 0.3 |
| BisGMA/TEDGMA 90/10 | 52.5 |
| TBATFB | 5 |
| (fluoride source) | |
| total | 100 |

Fluoride Release Testing:

Fluoride release levels in parts per million (ppm) were measured for the examples using a Mettler Toledo T70 titrator. A Cole Parmer fluoride electrode was first calibrated with parts per million (ppm) fluoride standards with TISAB III before measuring samples for fluoride content. Total Ionic Strength Adjustment Buffer (TISAB) III concentrate solution is for use with fluoride ion selective electrodes and is available from Sigma Aldrich. The fluoride ion selective electrode was placed in the titrator cup of diluted TISAB III solution and allowed to equilibrate for 30 seconds before analyzing each sample. The fluoride content in ppm was calculated against the fluoride standards calibration curve. For each of Example 1 and 2, sample sheets of 12.3 cm×3.4 cm were cut into 16 small pieces and stored in 10 mL of deionized water at 37° C. for 7 days. The sample water was collected and measured for fluoride concentration. Example 1 had a fluoride release concentration of 4.35 ppm of fluoride. Example 2 had a fluoride release concentration of 1.67 ppm of fluoride.

All cited references, patents, and patent applications in the above application for letters patent are herein incorporated by reference in their entirety in a consistent manner. In the event of inconsistencies or contradictions between portions of the incorporated references and this application, the information in the preceding description shall control. Various embodiments of the invention have been described. These and other embodiments are within the scope of the following claims.

The invention claimed is:

1. A method for making a dental appliance configured to position at least one tooth of a patient, the method comprising:

depositing a hardenable liquid resin composition on a major surface of a base polymeric material to form a pattern of discrete unhardened liquid regions thereon, wherein the hardenable liquid composition comprises a hardenable resin, a liquid carrier, and a therapeutic agent;

at least partially hardening the unhardened liquid regions to form an array of structures on the major surface of the base polymeric material, the array forming a discontinuous layer on the major surface;

forming an exterior layer comprising an ion-permeable polymeric material on the base polymeric material and the array of structures, the exterior layer being disposed over and in direct contact with both the array of structures and the base polymeric material; and forming a plurality of cavities in the base polymeric material to form the dental appliance, wherein the dental appliance comprises an arrangement of cavities configured to receive one or more teeth.

2. The method of claim 1, wherein about 20% to about 98% of the surface of the dental appliance is free of the structures.

3. The method of claim 1, wherein the structures have a characteristic cross-sectional dimension of about 25 microns to about 1 mm, and a center-to-center distance of about 100 microns to about 2000 microns.

4. The method of claim 3, wherein the array of structures define a structured region of the major surface, and wherein the structures present on the major surface in the structured region at a density of about 100 to about 5,000 dots per square inch.

5. The method of claim 1, wherein the exterior layer comprises a thermoplastic polymeric material compatible with the base polymeric material, wherein the exterior layer comprises a (meth) acrylate polymer or copolymer.

6. The method of claim 1, wherein the formed exterior layer has a thickness no greater than ⅕ the thickness of the base polymeric material.

7. The method of claim 1, wherein the dental appliance includes an anterior region and a posterior region, and wherein the array of structures is disposed only on the anterior region.

8. The method of claim 1, further comprising hardening the structures on the base polymeric material prior to forming the exterior layer.

9. The method of claim 1, wherein the therapeutic agent is at least one of an antimicrobial agent, an anti-biofilm agent, a friction-reducing agent, an anti-cavity agent, or a remineralization agent.

10. The method of claim 1, wherein the hardenable resin further comprises a polymerizable component, wherein the polymerizable component comprises one or more of: polyethylene glycol dimethacrylate, 2,2-bis [4-(2-hydroxy-3-methacryloxypropoxy)phenyl]propane, urethane dimethacrylate, glycerol dimethacrylate, triethyleneglycol dimethacrylate, neopentylglycol dimethacrylate, or resin-modified glass ionomers.

11. A dental appliance, comprising:

a base polymeric substrate comprising a plurality of cavities for receiving one or more teeth;

an array of structures on the substrate forming a discontinuous pattern, wherein the structures comprise a hardened resin and a therapeutic agent; and an exterior, fluid-permeable polymeric material layer disposed over and in direct contact with both the structures and the base polymeric substrate.

12. The dental appliance of claim 11, wherein the structures have a characteristic cross-sectional dimension of about 25 microns to about 1 mm, and a center-to-center distance of about 100 microns to about 2000 microns.

13. The dental appliance of claim 11, wherein the formed exterior layer has a thickness no greater than one fifth the thickness of the base polymeric substrate.

14. The dental appliance of claim 11, wherein the array of structures define a structured region of a major surface of the base polymeric substrate, and wherein the structures are present on the major surface in the structured region at a density of about 10 to about 10,000 dots per inch.

15. The dental appliance of claim 14, wherein the dental appliance includes an anterior region and a posterior region, and wherein the structured region is located only on the anterior region.

16. The dental appliance of claim 11, wherein the therapeutic agent is at least one of: a calcium compound, a phosphorous compound, or a fluoride compound.

17. A thermoformable film, comprising:

a base polymeric substrate;

an array of structures on the substrate forming a discontinuous pattern, wherein the structures comprise a hardened resin and a therapeutic agent; and an exterior, ion-permeable polymeric material layer disposed over and in direct contact with the structures and substrate.

18. The thermoformable film of claim 17, wherein the structures have a characteristic cross-sectional dimension of about 25 microns to about 1 mm, and a center-to-center distance of about 100 microns to about 2000 microns.

19. The thermoformable film of claim 17, wherein the array of structures defines a structured region of the major surface, and wherein the structures are present on the major surface in the structured region at a density of about 10 to about 10,000 dots per inch.

20. The thermoformable film of claim 17, wherein the exterior, ion-permeable polymeric material layer has a molecular weight in a range of about 10,000 to about 100,000 grams per mole.

* * * * *